United States Patent
Itoh et al.

(10) Patent No.: US 6,306,513 B1
(45) Date of Patent: Oct. 23, 2001

(54) OPTICAL ELEMENT HAVING CURED FILM

(75) Inventors: Takanobu Itoh, Tokyo; Keitaro Suzuki, Sodegaura; Yoshinari Koyama; Motoko Iijima, both of Funabashi, all of (JP)

(73) Assignee: Hoya Corporation, Tokyo (JP)

( * ) Notice: Subject to any disclaimer, the term of this patent is extended or adjusted under 35 U.S.C. 154(b) by 0 days.

(21) Appl. No.: 09/539,256

(22) Filed: Mar. 30, 2000

(30) Foreign Application Priority Data

Mar. 30, 1999  (JP) .................................................. 11-088449

(51) Int. Cl.$^7$ ....................................................... B32B 9/00
(52) U.S. Cl. ......................... 428/447; 428/446; 428/697; 428/701; 428/908.8; 516/90; 516/92
(58) Field of Search .................... 428/446, 447, 428/448, 428, 429, 697, 701; 516/90, 92

(56) References Cited

U.S. PATENT DOCUMENTS

| | | |
|---|---|---|
| 4,374,158 | 2/1983 | Taniguchi et al. . |
| 5,094,691 | 3/1992 | Watanabe et al. . |
| 5,188,667 | 2/1993 | Watanabe et al. . |
| 5,460,738 | * 10/1995 | Watanabe et al. ................. 252/313.1 |
| 5,472,797 | * 12/1995 | Yajima et al. ........................ 428/688 |

FOREIGN PATENT DOCUMENTS

| | | | |
|---|---|---|---|
| 50-40119 | 12/1975 | (JP) . | |
| 53-111336 | 9/1978 | (JP) . | |
| 54-52686 | 4/1979 | (JP) . | |
| 3-172369 | 7/1991 | (JP) . | |
| 6-25603 | 2/1994 | (JP) . | |
| 12-7340 | 1/2000 | (JP) . | |
| 12-63119 | 2/2000 | (JP) . | |
| 12-63754 | 2/2000 | (JP) . | |
| 2000063754 | * 2/2000 | (JP) | ............................. C09D/183/04 |

* cited by examiner

*Primary Examiner*—Robert Dawson
*Assistant Examiner*—Michael J Feely
(74) *Attorney, Agent, or Firm*—Griffin & Szipl, P.C.

(57) ABSTRACT

An optical element having, on an optical substrate, a cured film formed of a coating agent containing (A) modified stannic oxide-zirconium oxide composite colloid particles as prepared by coating at least a part of the surfaces of stannic oxide-zirconium oxide composite colloid particles with stannic oxide-tungsten oxide-silicon oxide composite colloid particles, and (B) an organosilicon compound.

32 Claims, No Drawings

2

OPTICAL ELEMENT HAVING CURED FILM

This application claims priority on Japanese Patent Application No. 088449/1999, filed Mar. 30, 1999, the entire disclosure of which is incorporated herein by reference.

TECHNICAL FIELD OF THE INVENTION

The present invention relates to an optical element having a cured film coating, more precisely, to an optical element having a cured film coating (hereinafter simply referred to as a "cured film"), which has good scratch resistance, good moisture resistance and good weather resistance, and whose properties are little degraded even when further coated with a deposited film of an inorganic oxide.

RELATED AND BACKGROUND ART

Heretofore, in general, in order to make plastic moldings have scratch resistance, a method of providing a coating film with scratch resistance on the surface of the molding has been employed. Coating compositions proposed to be used for forming such a coating film, include, for example, a coating composition containing a colloidally-dispersed silica sol (Japanese Patent Laid-Open No. 111336/1978), a coating composition containing fine tin oxide particles coated with fine tungsten oxide particles (Japanese Patent Laid-Open No. 172369/1991), a coating composition containing a sol of tin oxide colloid particles modified with tin oxide-tungsten composite colloid particles (Japanese Patent Laid-Open No. 25603/1994), etc.

However, these prior coating compositions are all problematic in that, when they are coated, for example, on optical substrates, they could not form film coatings capable of making the coated substrates have good scratch resistance and good moisture resistance while also having an esthetic appearance (as used herein, esthetic appearance means that the coated substrates do not form interference fringes caused by a difference in the refractive index between the film coating and the substrate) and good weather resistance. Furthermore, even if an additional deposited film were provided thereon, the resulting coated substrates still could not have satisfactory scratch resistance and satisfactory moisture resistance while also having an esthetic appearance and good weather resistance.

The object of the present invention is therefore to solve the problems with the prior film coatings. Specifically, it is an object to provide an optical element having a cured film, which has good esthetic appearance, good weather resistance, good scratch resistance and good moisture resistance, and whose properties are little degraded even when further coated with a deposited film.

SUMMARY OF THE INVENTION

In accordance with the above objects, the present inventors have assiduously studied the problems of the prior art and developed an optical element having a cured film having good properties as described above. As a result, the inventors have found that, when a coating composition containing specific modified stannic oxide-zirconium oxide composition colloid particles and an organosilicon compound is coated on an optical substrate to form a cured film thereon, then the above objects can be attained.

Specifically, the present invention provides an optical element having a cured film on an optical substrate. The cured film is formed of a coating agent containing (A) modified stannic oxide-zirconium oxide composite colloid particles as prepared by coating at least a part of the surfaces of stannic oxide-zirconium oxide composite colloid particles with stannic oxide-tungsten oxide-silicon oxide composite colloid particles, and (B) an organosilicon compound.

DETAILED DESCRIPTION OF THE PREFERRED EMBODIMENTS

The invention will now be described in detail with reference to certain preferred embodiments. The optical element having a cured film according to the present invention (hereinafter simply referred to as "optical element of the invention") comprises an optical substrate and a cured film of a specific coating agent provided thereon. The coating agent of the invention comprises (A) modified stannic oxide-zirconium oxide composite colloid particles, and (B) an organosilicon compound.

The modified stannic oxide-zirconium oxide composite colloid particles of component (A) are prepared by coating all or a part of the surfaces of (1) stannic oxide-zirconium oxide composite colloid particles with (2) stannic oxide-tungsten oxide-silicon oxide composite colloid particles. The colloid particles of component (1) become the nuclei of the modified stannic oxide-zirconium oxide composite colloid particles. Preferably, the particles of component (1) are composed of stannic oxide colloid particles and zirconium oxide colloid particles bonded in a ratio by weight, $ZrO_2/SnO_2$, falling between about 0.02 and about 1.0, and have a particle size of from about 4 to about 50 nm, dependant on the properties of the coating agent to be prepared.

The stannic oxide-tungsten oxide-silicon oxide composite colloid particles of component (2) which coat all or a part of the surfaces of the colloid particles of component (1) have a ratio by weight, $WO_3/SnO_2$, falling between about 0.1 and about 100, and a ratio by weight, $SiO_2/SnO_2$, falling between about 0.1 and about 100, and have a particles size of from about 2 to about 7 nm, more preferably from about 2 to about 5 nm, dependant on the properties of the coating agent to be prepared.

In view of the stability and the properties of the coating agent containing them, the modified stannic oxide-zirconium oxide composite colloid particles of component (A) preferably have a particle size of from about 4.5 to about 60 nm.

According to the present invention, the modified stannic oxide-zirconium oxide composite colloid particles of the component (A) can be efficiently prepared, for example, according to a process comprising the following steps (a), (b), (c), (d) and (e).

Step (a):

Step (a) comprises mixing an aqueous stannic oxide sol with an aqueous solution or suspension of an oxyzirconium salt. Preferably, the aqueous stannic oxide sol contains stannic oxide colloid particles having a particle size of from about 4 to about 50 nm, and has an $SnO_2$ concentration of from about 0.5 to about 50% by weight, more preferably from about 1 to about 30% by weight. The aqueous stannic oxide sol may be prepared by any known method including, for example, an ion-exchanging method, a deflocculation method, a hydrolysis method, a reaction method, etc.

Examples of the ion-exchanging method include: processing a stannate such as sodium stannate or the like with a hydrogen-type cation exchange resin, processing a stannic salt such as stannic chloride, stannic nitrate or the like with a hydroxyl-type anion exchange resin, etc. Examples of the deflocculation method include: washing a stannic hydroxide gel prepared by neutralizing a stannic salt with a base or by neutralizing stannic acid with hydrochloric acid, followed by deflocculating the washed gel with an acid or a base, etc. Examples of the hydrolysis method includes: hydrolyzing a tin alkoxide, hydrolyzing a basic salt of stannic chloride under heat followed by removing the unnecessary acid from the resulting hydrolyzate, etc. Examples of the reaction method include: a method of reacting metal tin powder with an acid, etc.

The medium for the stannic oxide sol may be any of water, or hydrophilic organic solvents and their mixtures, but is preferably water to give an aqueous sol. In general, the pH of the sol preferably falls between about 0.2 and about 11, in view of the stability of the sol. Within a range not interfering with the objects of the invention, the stannic oxide sol may contain any optional components including, for example, an alkaline substance, an acidic substance, a hydroxy carboxylic acid and the like for stabilizing the sol.

The aqueous solution or suspension of an oxyzirconium salt preferably has an oxyzirconium salt concentration of from about 0.5 to about 50% by weight, more preferably from about 1 to about 30% by weight. The oxyzirconium salt includes, for example, zirconium oxychloride, zirconium oxynitrate, zirconium oxysulfate, oxyzirconium salts of organic acids such as zirconium oxyacetate, and also zirconium oxycarbonate, etc. Preferably, the oxyzirconium salts are used in the form of their aqueous solutions. However, when the aqueous stannic oxide sol to be mixed with the oxyzirconium salt is acidic, even water-insoluble oxyzirconium salts such as zirconium oxycarbonate can be used according to the present invention in the form of aqueous suspensions.

In the step (a), the aqueous stannic oxide sol is mixed with the aqueous solution or suspension of an oxyzirconium salt in a ratio by weight, $ZrO_2/SnO_2$ falling between about 0.02 and about 1.0. In particular, the stannic oxide sol is preferably an alkaline sol stabilized with an organic base such as an amine, or the like. Mixing the stannic oxide sol with the aqueous solution or suspension of an oxyzirconium salt may be effected at a temperature generally falling between about 0 and about 100° C., but preferably falling between about room temperature and about 60° C. To mix the components, the aqueous solution or suspension of an oxyzirconium salt may be added to the stannic oxide sol with stirring; or, the stannic oxide sol may be added to the aqueous solution or suspension of an oxyzirconium salt. Preferred is the latter. Mixing must be effected sufficiently, and is preferably continued for about 0.5 to about 3 hours or so.

Step (b):

In step (b), the mixture obtained in the previous step (a) is heated to form an aqueous, stannic oxide-zirconium oxide composite sol having a particle size of from about 4 to about 50 nm. Preferably, the heat treatment is effected at a temperature falling between about 60 and about 200° C. for about 0.1 to about 50 hours or so.

Step (c):

Step (c) comprises forming a tungsten oxide-stannic oxide-silicon dioxide composite sol.

According to this step of the present invention, one first prepares an aqueous solution containing a tungstate, a stannate and a silicate in a ratio by weight, $WO_3/SnO_2$ and a ratio by weight, $SiO_2/SnO_2$ each falling generally between about 0.1 and about 100. In this stage, any of water, hydrophilic organic solvents or mixtures thereof may be used as the medium.

Salts of tungstate, stannate and silicate include, for example, alkali metal salts, ammonium salts, amine salts, etc. Examples of the alkali metal salts include lithium salts, sodium salts, potassium salts, rubidium salts, cesium salts, etc. Preferred examples of the amine salts include salts with alkylamines such as ethylamine, triethylamine, isopropylamine, n-propylamine, isobutylamine, diisobutylamine, di(2-ethylhexyl)amine, etc.; salts with aralkylamines such as benzylamine, etc.; salts with alicyclic amines such as piperidine, etc.; salts with alkanolamines such as monoethanolamine, triethanolamine, etc. Especially preferred are sodium tungstate ($Na_2WO_4.2H_2O$), sodium stannate ($Na_2SnO_3.3H_2O$), and sodium silicate (water glass). Also usable in the present invention are solutions prepared by dissolving tungsten oxide, tungstic acid, stannic acid, silicic acid or the like in an aqueous solution of an alkali metal hydroxide. Silicates used according to the present invention include amine silicates and quaternary ammonium silicates prepared by adding an alkylamine such as ethylamine, triethylamine, isopropylamine, n-propylamine, isobutylamine, diisobutylamine, di(2-ethylhexyl)amine or the like to an activated silicic acid.

The method of preparing an aqueous solution containing a tungstate, a stannate and a silicate is not specifically limited. For example, one can employ any of: a method of dissolving powders or a tungstate, a stannate and a silicate in an aqeuous medium to prepare an aqueous solution of the salts, a method of mixing an aqueous solution of a tungstate, an aqueous solution of a stannate and an aqueous solution of a silicate to prepare an aqueous solution of the salts, a method of adding powders of a tungstate and a stannate and an aqueous solution of a silicate to an aqueous medium to prepare an aqueous solution of the salts, etc.

In the method of mixing according to the present invention, the aqueous tungstate solution preferably has a concentration of from 0.1 to about 15% by weight in terms of $WO_3$, and the aqueous stannate solution and the aqueous silicate solution each preferably have a concentration of from about 0.1 to about 30% by weight in terms of $SnO_2$ and $SiO_2$, respectively.

In the step (c), preparing the aqueous solution containing a tungstate, a stannate and a silicate is preferably effected with stirring at a temperature falling between about room temperature and about 100° C., more preferably between about room temperature and about 60° C.

Thereafter in step (c), the cations in the thus-prepared aqueous solution containing the salts are removed. To remove the cations, for example, one can employ a method of contacting the solution with a hydrogen-type ion exchanger, or a method of subjecting the solution to salting-out treatment, or the like. The hydrogen-type ion exchanger is not specifically limited, and may be any ordinary ion exchanger, including, for example, commercially-available hydrogen-type cation exchange resins.

In the above manner, one obtains an aqueous sol that contains tungsten oxide-stannic oxide-silicon dioxide composite colloid particles having a particle size of from about 2 to about 7 nm, preferably from about 2 to about 5 nm. The particles size of the colloid particles can be determined through electron microscopy.

The total concentration of $WO_3$, $SnO_2$ and $SiO_2$ in the aqueous sol is generally at most about 40% by weight. If the concentration is higher than about 40% by weight, the stability of the sol will be poor. If the concentration is too low, however, the sol will be impracticable. Therefore, the concentration is preferably at least about 2% by weight. More preferably, the concentration falls between about 5 and about 30% by weight. If the concentration of the aqueous sol, from which the cations have been removed, is low, it may be increased in any one of a number of ordinary concentrating methods, of the sol, for example, through evaporation, ultrafiltration, or the like. Especially preferred is ultrafiltration. While being concentrated, the sol is preferably kept at a temperature not higher than about 100° C. or so, more preferably not higher than about 60° C. or so.

If the sol is concentrated through ultrafiltration, the polyanions, ultra-fine particles, etc., in the sol will pass through the ultrafiltration membrane along with the water. Therefore, the polyanions, ultra-fine particles, etc., which often destabilize the sol can be removed from the sol.

In the aqueous sol, preferably, the tungsten oxide-stannic oxide-silicon dioxide composite colloid particles have a ratio by weight, $WO_3/SnO_2$, and a ratio by weight, $SiO_2/SnO_2$, each falling between about 0.1 and about 100. If the weight ratios fall outside the defined range, the stability of the sol will be low, and, in addition, a modified composite sol having desired properties is difficult to obtain. Therefore, weight ratios outside of the defined ranges are unfavorable.

Preferably, the pH of the aqueous sol falls between about 1 to about 9. If its pH is lower than about 1, the sol will be unstable; and if higher than about 9, the tungsten oxide-stannic oxide-silicon dioxide composite colloid particles will easily dissolve in the liquid.

Control of pH may be effected by the use of an acidic substrate or an alkaline substance. The acidic substance is not specifically limited. Where an organosol mentioned below is prepared, a hydroxycarboxylic acid is preferred in view of the stability of the sol. Examples of hydroxycarboxylic acid include lactic acid, tartaric acid, citric acid, gluconic acid, malic acid, glycolic acid, etc. One or more hydroxycarboxylic acids may be used either singly or in combination. The amount of acid to be used is preferably smaller than about 30% by weight of the total amount of $WO_3$, $SnO_2$ and $SiO_2$ in the sol. Too much acid over about 30% by weight, if used, will lower the waterproofness of the resultant cured film.

Examples of the alkaline substance include alkali metal hydroxide with Li, Na, L, Rb, Cs, or the like; ammonia; alkylamines such as ethylamine, triethylamine, isopropylamine, n-propylamine, etc.; aralkylamines such as benzylamine, etc.; alicyclic amines such as piperidine, etc.; alkanolamines such as monoethanolamine, triethanolamine, etc. One or more alkaline substances may be used either singly or in combination, or may be combined with above-mentioned acidic substances.

The thus-obtained, tungsten oxide-stannic oxide-silicon dioxide composite sol is a colorless, transparent, or colloidally-tinted liquid. The sol is stable for 3 months or longer at room temperature, and for 1 month or longer even at about 60° C., without forming any precipitate therein, or without being thickened or gelled.

Water is the aqueous sol prepared in the step (c) may be substituted with a hydrophilic organic solvent to give a hydrophilic organic solvent sol, which is referred to as an organosol.

The tungsten oxide-stannic oxide-silicon dioxide composite sol obtained in the step (c) contains composite particles of tungsten oxide-stannic oxide-silicon dioxide with stannic, oxide, tungsten oxide and silicon dioxide being compounded (in solid solution) uniformly on the atomic level. Therefore, the sol differs form a mixed sol as prepared by merely mixing three sols, tungsten oxide sol, stannic oxide sol and silicon dioxide sol. In the composite sol of tungsten oxide-stannic oxide-silicon dioxide, the composite particles of tungsten oxide-stannic oxide-silicon dioxide form a solid solution. Therefore, even when subjected to solvent substitution, the composite sol is not decomposed into the individual tungsten oxide particles, stannic oxide particles and silicon dioxide particles. In addition, the film of the composite sol of tungsten oxide-stannic oxide-silicon dioxide formed on a substrate has better waterproofness, better moisture resistance and better weather resistance, as compared with that of a composite sol of tungsten oxide-stannic oxide formed on the same substrate.

Step (d):

Step (d) comprises mixing the aqueous, stannic oxide-zirconium oxide composite sol prepared in the previous step (b) with the tungsten oxide-stannic oxide-silicon dioxide composite sol prepared in step (c) to form an aqueous, modified stannic oxide-zirconium oxide composite sol.

In this step, the stannic oxide-zirconium oxide composite sol (nucleic sol) prepared in the previous step (b) is mixed with the tungsten oxide-stannic oxide-silicon dioxide composite sol (cover sol) prepared in the step (c), in such a ratio that the total of $WO_3$, $SnO_2$ and $SiO_2$ in the sol of step (c) is from about 2 to about 100 parts by weight relative to 100 parts by weight of the total of the metal oxides ($ZrO_2+SnO_2$) in the sol of step (b). Advantageously, the sols are mixed while strongly stirred at a temperature falling generally between about 0 and about 100° C. but preferably between room temperature and about 60° C.

If the total amount of the metal oxides ($WO_3+SnO_2+SiO_2$) in the cover sol is smaller than about 2 parts by weight relative to about 100 parts by weight of the total amount of the metal oxides ($ZrO_2+SnO_2$) in the nucleic sol, a stable composite sol could not be obtained; but if larger than about 100 parts by weight, a mixed sol of a modified stannic oxide-zirconium oxide composite sol and the remaining nucleic sol will be formed. Therefore, overstepping the defined range for the blend ratio is unfavorable.

In the manner described above, the colloid particles of the tungsten oxide-stannic oxide-silicon dioxide composite sol are bonded to the surfaces of the colloid particles of the stannic oxide-zirconium oxide composite sol. The surfaces of the stannic oxide-zirconium oxide composite colloid particles are coated with the tungsten oxide-stannic oxide-silicon dioxide composite colloid particles to give modified stannic oxide-zirconium oxide composite colloid particles. In the resulting modified composite, the stannic oxide-zirconium oxide composite colloid particles serve as nuclei, and resultant modified composite particles exhibit the properties of the tungsten oxide-stannic oxide-silicon dioxide composite that covers the nuclei. In step (d), the modified stannic oxide-zirconium oxide composite colloid particles are formed in the form of a sol where the particles are stably dispersed in a liquid medium.

The modified stannic oxide-zirconium oxide composite colloid particles in the sol thus obtained through the mixing operation in the step (d) can be observed with an electronic microscope, and they generally have a particle size of from about 4.5 to about 60 nm. The sol obtained through the mixing operation has a pH of approximately from about 1 to about 9. However, it contains many anions of $Cl^-$, $NO_3^-$, $CH_3COO^-$ and others that are derived from the oxyzirconium salt used for the modification. Therefore, the colloid particles in the sol are micro-aggregated, and the transparency of the sol is low.

The modified stannic oxide-zirconium oxide composite colloid particles that are covered with the tungsten oxide-stannic oxide-silicon dioxide composite colloid particles in the invention are negatively charged in the sol which contains them. On the other hand, the stannic oxide-zirconium oxide composite colloid particles are positively charged, while the tungsten oxide-stannic oxide-silicon dioxide composite colloid particles are negatively charged. Therefore, it is believed that, in the mixing operation in the step (d), the positively-charged stannic oxide-zirconium oxide composite colloid particles electrically attract the negatively-charged tungsten oxide-stannic oxide-silicon dioxide composite colloid particles around them, whereby the thus-attracted tungsten oxide-stannic oxide-silicon dioxide composite colloid particles chemically bond onto the surfaces of the positively-charged stannic oxide-zirconium oxide composite colloid particles. As a result, the surfaces of the positively-charged particles that serve as the nuclei are covered with the tungsten oxide-stannic oxide-silicon dioxide composite to give the modified stannic oxide-zirconium oxide composite colloid particles.

Step (e):

Step (e) comprises contacting the aqueous, modified stannic oxide-zirconium oxide composite sol prepared in the previous step (d) with an anion exchanger to thereby remove the anions from the sol.

Contacting the sol with an anion exchanger may be effected at a temperature generally not higher than about 100° C., but preferably at a temperature falling between room temperature and about 60° C. One can employ as the anion exchanger any commercially-available hydroxyl-type anion exchange resins, but preferred are strong base-type anion exchange resins such as Amberlite 410. Advantageously, in this step, the sol prepared in the step (d) is treated with such an anion exchanger while the metal oxide concentration in the sol is controlled to fall between about 1 and about 10% by weight.

The anions are removed from the sol in the manner described above, and a stable sol of modified stannic oxide-zirconium oxide composite colloid particles having a pH of from about 3 to about 11 and having high transparency is obtained.

Where the concentration of the modified stannic oxide-zirconium oxide composite sol thus obtained is desired to be increased more, the sol may be concentrated to have a concentration of up to at most about 50% by weight. Concentration is carried out in an ordinary manner, for example, through evaporation, ultrafiltration, or the like. Where the pH of the sol is desired to be changed, the above-mentioned alkali metal hydroxide, ammonia, amine, hydroxycarboxylic acid or the like may be added to the concentrated sol. In particular, the sol having a total concentration of the metal oxides ($ZrO_2+SnO_2$) and ($WO_3+SnO_2+SiO_2$) of from 10 to 40% by weight is preferred for practical use.

If the pH of the modified stannic oxide-zirconium oxide composite sol is lower than about 3, the sol will be unstable; but if higher than about 11, the tungsten oxide-stannic oxide-silicon dioxide composite that covers the modified stannic oxide-zirconium oxide composite colloid particles will easily dissolve in the liquid. If the total concentration of the metal oxides ($ZrO_2+SnO_2$) and ($WO_3+SnO_2+SiO_2$) in the sol of the modified stannic oxide-zirconium oxide composite colloid particles is higher than about 50% by weight, the sol will be unstable.

Where the modified stannic oxide-zirconium oxide composite sol is an aqueous sol, the aqueous medium in the aqueous sol may be substituted with a hydrophilic organic solvent, whereby the aqueous sol may be converted into an organosol. The substitution may be effected in any ordinary method of, for example, evaporation, ultrafiltration or the like. Examples of the hydrophilic organic solvent include lower alcohols such as methyl alcohol, ethyl alcohol, isopropyl alcohol, etc.; linear amides such as dimethylformamide, N,N-dimethylacetamide, etc.; cyclic amides such as N-methyl-2-pyrrolidone, etc.; glycols such as ethyl cellosolve, ethylene glycol, etc.

The sol prepared through the above-mentioned steps (a) to (e) and containing the resulting modified stannic oxide-zirconium oxide composite colloid particles of component (A) in the coating agent for use in the invention is stable for 3 months or longer at room temperature and for 1 month or longer even at about 60° C., without forming any precipitate therein, or without being thickened or gelled. The sol is colorless and transparent, and a cured film made from the sol has a refractive index of approximately from about 1.7 to about 1.8, and has high bonding strength, high hardness, good lightproofness, good static electricity resistance, good heat resistance and good abrasion resistance. In particular, the waterproofness and the moisture resistance of the cured film are much higher than those of conventional films. The reason is believed to be that the silicon dioxide component in the tungsten oxide-stannic oxide-silicon oxide colloid particles forms siloxane bonding in the cured film, thereby improving the waterproofness and the moisture resistance of the film.

In addition to the modified sol component (A), the coating agent for use in the invention contains component (B) an organosilicon compound. The organosilicon compound is, for example, at least one compound selected from compounds of general formulas (I) and (II) and hydrolysates of (I) and (II);

wherein compounds of formula (I) are:

wherein $R^1$ represents a monovalent hydrocarbon group having from 1 to 20 carbon atoms, and having or not having a functional group; $R^2$ represents an alkyl, aryl, aralkyl or acyl group having from 1 to 8 carbon atoms; n represents 0, 1 or 2; and plural $R^1$'s, if any, may be the same or different, and plural $R^2O$'s may be the same or different; and wherein compounds of a general formula (II) are:

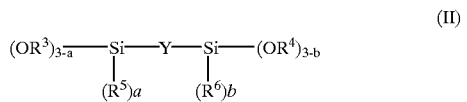

wherein $R^3$ and $R^4$ each represent an alkyl or acyl group having from 1 to 4 carbon atoms, and may be the same or different; $R^5$ and $R^6$ each represent a monovalent hydrocarbon group having from 1 to 5 carbon atoms, and having or not having a fuctional group, and may be the same or different; Y represents a divalent hydrocarbon group having from 2 to 20 carbon atoms; a and b each represent 0 or 1; and plural $OR^3$'s may be the same or different, and plural $OR^4$'s may be the same or different.

In formula (I), the monovalent hydrocarbon group having from 1 to 20 carbon atoms for $R^1$ includes a linear, branched or cyclic alkyl group having from 1 to 20 carbon atoms, a linear, branched or cyclic alkenyl group having from 2 to 20 carbon atoms, an aryl group having from 6 to 20 carbon atoms, and an aralkyl group having from 7 to 20 carbon atoms. The alkyl group having from 1 to 20 carbon atoms is preferably one having from 1 to 10 carbon atoms, including, for example, a methyl group, an ethyl group, and n-propyl group, an isopropyl group, an n-butyl group, an isobutyl group, a sec-butyl group, a tert-butyl group, a pentyl group, a hexyl group, an octyl group, a cyclopentyl group, a cyclohexyl group, etc. The alkenyl group having from 2 to 20 carbon atoms is preferably an alkenyl group having from 2 to 10 carbon atoms, including, for example, a vinyl group, an allyl group, a butenyl group, a hexenyl group, an octenyl group, etc. The aryl group having from 6 to 20 carbon atoms is preferably one having from 6 to 10 carbon atoms, including, for example, phenyl groups, tolyl groups, xylyl groups, naphthyl groups, etc. The aralkyl group having from 7 to 20 carbon atoms is preferably one having from 7 to 10 carbon atoms, including, for example, benzyl groups, phenethyl groups, phenylpropyl groups, naphthylmethyl groups, etc.

These hydrocarbon groups may have a functional group introduced thereinto. The functional group includes, for example, halogens, glycidoxy groups, epoxy groups, amino groups, mercapto groups, cyano groups, (meth)acryloyloxy groups, etc. The preferred hydrocarbon group having a functional group is an alkyl group having from 1 to 10 carbon atoms and having a functional group. The preferred group includes, for example, γ-chloropropyl groups, 3,3,3-trichloropropyl groups, chloromethyl groups, glycidoxymethyl groups, α-glycidoxyethyl groups, β-glycidoxyethyl groups, α-glycidoxypropyl groups, β-glycidoxypropyl groups, γ-glycidoxypropyl groups, α-glycidoxybutyl groups, β-glycidoxybutyl groups, γ-glycidoxybutyl groups, δ-blycidoxybutyl groups, (3,4-epoxycyclohexyl)methyl group, β-(3,4-epoxycyclohexyl)ethyl groups, γ-(3,4-epoxycyclohexyl)propyl groups, δ-(3,4-epoxycyclohexyl)butyl groups, N-(β-aminoethyl)-γ-aminopropyl groups, γ-aminopropyl groups, γ-mercaptopropyl groups, β-cyanoethyl groups, γ-methacryloyloxypropyl groups, γ-acryloyloxypropyl groups, etc.

The alkyl group having from 1 to 8 carbon atoms for $R^2$ may be linear, branches or cyclic, including, for example, methyl groups, ethyl groups, n-propyl groups, isopropyl groups, n-butyl groups, isobutyl groups, sec-butyl groups, tert-butyl groups, pentyl groups, hexyl groups, cyclopentyl groups, cyclohexyl groups, etc. The aryl group includes, for example, phenyl groups, tolyl groups, etc. The aralkyl group includes, for example, benzyl groups, phenethyl groups, etc. The acyl group includes, for example, acetyl groups, etc.

The variable n is 0, 1 or 2; and plural $R^1$'s, if any, may be the same or different, and plural $R^2O$'s may be the same or different.

Examples of the compounds of formula (I) include methyl silicate, ethyl silicate, n-propyl silicate, isopropyl silicate, n-butyl silicate, sec-butyl silicate, tert-butyl silicate, tetraacetoxysilane, methyltrimethoxysilane, methyltripropoxysilane, methyltriacetoxysilane, methyltributoxysilane, methyltripropoxysilane, methyltriamyloxysilane, methyltriphenoxysilane, methyltribenzyloxysilane, methyltriphenethyloxysilane, glycidoxymethyltrimethoxysilane, glycidoxymethyltriethoxysilane, a-glycidoxyethyltrimethoxysilane, α-glycidoxyethyltriethoxysilane, β-glycidoxyethyltriethoxysilane, α-glycidoxypropyltrimethoxyslane, α-glycidoxypropyltriethoxysilane, β-glycidoxypropyltrimethoxysilane, β-glycidoxypropyltriethoxysilane, γ-glycidoxypropyltrimethoxysilane, γ-glycidoxypropyltriethoxysilane, γ-glycidoxypropyltripropoxysilane, γ-glycidoxypropyltriphenoxysilane, α-glycidoxybutyltrimethoxysilane, α-glycidoxybutyltriethoxysilane, β-glycidoxybutyltrimethoxysilane, γ-glycidoxybutyltriethoxysialne, γ-glycidoxybutyltrimethoxysilane, γ-glycidoxybutyltriethoxysilane, δ-glycidoxybutyltrimethoxysilane, δ-glycidoxybutyltriethoxysilane, (3,4-epoxycyclohexyl)methyltrimethoxysilane, (3,4-epoxycyclohexyl)methyltriethoxysilane, β-(3,4-epoxycyclohexyl)ethyltrimethoxysilane, β(3,4-epoxycyclohexyl)ethyltriethoxysilane, β(3,4-epoxycyclohexyl)ethyltripropoxysilane, β(3,4-epoxycyclohexyl)ethyltributoxysilane, β(3,4-epoxycyclohexyl)ethyltriphenoxysilane, γ(3,4-epoxycyclohexyl)propyltrimethoxysilane, γ(3,4-epoxycyclohexyl)propyltriethoxysilane, δ-(3,4-epoxycyclohexyl)butyltrimethoxysilane, δ-(3,4-epoxycyclohexyl)butyltriethoxysilane, glycidoxymethylmethyldimethoxysilane, glycidoxymethylmethyldiethoxysilane, α-glycidoxyethylmethyldimethoxysilane, α-glycidoxyethylmethyldiethoxysilane, β-glycidoxyethylmethyldimethoxysilane, β-glycidoxyethylmethyldiethoxysilane, α-glycidoxypropylmethyldimethoxysilane, α-glycidoxypropylmethyldiethoxysilane, β-glycidoxypropylmethyldimethoxysilane, α-glycidoxypropylmethyldiethoxysilane, γ-glycidoxypropylmethyldimethoxysilane, γ-glycidoxypropylmethyldiethoxysilane, γ-glycidoxypropylmethyldipropoxysilane, γ-glycidoxypropyltrimethoxysilane, γ-glycidoxypropylmethyldiphenoxysilane, γ-glycidoxypropylethyldimethoxysilane, γ-glycidoxypropylethyldiethoxysilane, γ-glycidoxypropylvinyldimethoxysilane, γ-glycidoxypropylvinyldiethoxysilane, γ-glycidoxypropylphenyldimethoxysilane, γ-glycidoxypropylphenyldiethoxysilane, ethyltrimethoxysilane, ethyltriethoxysilane, vinyltrimethoxysilane, vinyltriacetoxysilane, vinyltriethoxysilane, phenyltrimethoxysilane, phenyltriethoxysilane, phenyltriacetoxysilane, γ-chloropropyltrimethoxysilane, γ-chloropropyltriacetoxysilane, 3,3,3-trifluoropropyltrimethoxysilane, γ-methacryloyloxypropyltrimethoxysilane, γ-mercaptopropyltrimethoxysilane, γ-mercaptopropyltriethoxysilane, β-cyanoethyltriethoxysilane, chloromethyltrimethoxysilane, chloromethyltriethoxysilane, N-(β-aminoethyl)-γ-aminopropyltrimethoxysilane, N-(β-aminoethyl)-γ-aminopropylmethyldimethoxysilane, γ-aminopropylmethyldimethoxysilane, N-(β-aminoethyl)-γ-aminopropylmethyldimethoxysilane, N-(β-aminoethyl)-γ-aminopropylmethlydiethoxysilane, dimethyldimethoxysilane, phenylmethyldimethoxysilane, dimethyldiethoxysilane, phenylmethyldiethoxysilane, γ-chloropropylmethyldimethoxysilane, γ-chloropropylmethyldiethoxysilane, dimethyldiacetoxysilane, γ-methacryloyloxypropylmethyldimethoxysilane, γ-methacryloyloxypropylmethyldiethoxysilane, γ-mercaptopropylmethyldimethoxysilane, γ-mercaptopropylmethyldiethoxysilane, methylvinyldimethoxysilane, methylvinyldiethoxysilane, etc.

In formula (II), the alkyl group having from 1 to 4 carbon atoms for $R^3$ and $R^4$ includes, for example, methyl groups, ethyl groups, n-propyl groups, isopropyl groups, n-butyl groups, isobutyl groups, sec-butyl groups, tert-butyl groups, etc. The acyl group is preferably an acetyl group. $R^3$ and $R^4$ may be the same or different. The monovalent hydrocarbon group having from 1 to 5 for $R^5$ and $R^6$ includes, for example, an alkyl group having from 1 to 5 carbon atoms, and an alkenyl group having from 2 to 5 carbon atoms.

These may be linear or branched. Examples of the alkyl group include methyl groups, ethyl groups, n-propyl groups, isopropyl groups, n-butyl groups, sec-butyl groups, tert-butyl groups, pentyl groups, etc. The alkenyl group includes, for example, vinyl groups, allyl groups, butenyl groups, etc.

These hydrocarbon groups may have a functional group. Examples of the functional group and the functional group-containing hydrocarbon group include mentioned hereinabove for $R^1$ in formula (I). $R^5$ and $R^6$ may be the same or different. The divalent hydrocarbon group having from 2 to 20 carbon atoms for Y is preferably an alkylene or alkylidene group having from 2 to 10 carbon atoms, including, for example, methylene groups, ethylene groups, propylene groups, butylene groups, ethylidene groups, propylidene groups, etc.

The variables a and b each represent 0 or 1. Plural $OR^3$'s may be the same or different, and plural $OR^4$'s may be the same or different.

Examples of the compounds of formula (II) include methylenebis(methyldimethoxysilane), ethylenebis(ethyldimethoxysilane), propylenebis(ethyldiethoxysilane), butylenebis(methyldiethoxysilane), etc.

One or more compounds suitably selected from the compounds of formulae (I) and (II) and hydrolyzates thereof may be used either singly or as combined, as the organosilicon compound for component (B) of the coating agent according to the present invention. The hydrolyzates may be prepared by adding to aqueous basic solution, such as an aqueous solution of sodium hydroxide, ammonia or the like, or an aqueous acidic solution, such as an aqueous solution of acetic acid, an aqueous solution of citric acid or the like, to the organosilicon compound of formulae (I) and (II), followed by stirring the resulting mixture.

The ratio of component (A), modified stannic oxide-zirconium oxide composite colloid particles to component (B), organosilicon compound in the coating agent for use in the invention, is desirably so that the coating agent contains from about 1 to about 500 parts by weight, in terms of its solid content, of component (A) relative to 100 parts by weight of component (B). If the amount of the component (A) is smaller than 1 part by weight, the refractive index of the cured film formed of the coating agent will be small. If so, the application of the coating agent to substrates will be limited. If, on the other hand, the amount of component (A) is larger than about 500 parts by weight, the interface between the cured film and the substrate will be cracked, and, in addition, the transparency of the cured film will be low.

The optical substrate to be used in the optical element of the invention includes plastic substrates of, for example, methyl methacrylate homopolymers, copolymers from monomer components of methyl methacrylate and one or more comonomers, diethylene glycol bisallylcarbonate homopolymers, copolymers from monomer components of diethylene glycol bisallylcarbonate and one or more comonomers, sulfur-containing copolymers, halogen-containing copolymers, polycarbonates, polystyrenes, polyvinyl chlorides, unsaturated polyesters, polyethylene terephthalates, polyurethanes, polythiourethanes, etc. Plastic lenses having a refractive index of from 1.55 to 1.62 are suitable for the substrate, in consideration of the esthetic appearance of the coated lenses (esthetic appearance means that the coated lenses do not form interference fringes caused by the difference in refractive index between the coating film and the lens substrate).

The coating agent for use in the invention may optionally contain a curing agent for promoting the reaction, fine metal oxide particles for controlling the refractive index of the cured film so as to make the film compatible with various substrates, and various organic solvents and surfactants for improving the wettability of the coating agent applied to substrates and for improving the smoothness of the cured film. In addition, UV absorbents, antioxidants, light stabilizers and other components may also be added to the coating agent, so far as they do not have any negative influence on the physical properties of the cured film.

Examples of the curing agent include amines such as allylamine, ethylamine, etc.; various acids and bases including Lewis acids and Lewis bases, salts or metal salts with organic carboxylic acids, chromic acid, hypochlorous acid, boric acid, perchloric acid, bromic acid, selenious acid, thiosulfuric acid, orthosilicic acid, thiocyanic acid, nitrous acid, aluminic acid, carbonic acid or the like; as well as metal alkoxides with aluminum, zirconium, titanium or the like, and their metal chelate compounds.

The fine metal oxide particles may be any conventional particles, including, for example, fine particles of aluminum oxide, titanium oxide, antimony oxide, zirconium oxide, silicon oxide, cerium oxide, iron oxide, etc.

To cure the coating agent, in general, the coating agent is dried with hot air or is exposed to active radiation. The curing conditions are preferably such that the coating agent is exposed to hot air at 70 to 200° C., more preferably at 90 to 150° C. The active radiation include IR rays, etc. Because such radiation preferably does not generate heat, such radiation cause little damage to the coating agent exposed thereto.

The method for forming a cured film of the coating agent on a substrate according to the invention preferably employs the above-mentioned method of applying the coating agent to a substrate. Applying the coating agent to a substrate may be effected in any ordinary manner, for example, through dipping, spin-coating, spraying, etc. In view of the plane accuracy, a dipping method and a spin-coating method are especially preferred.

Prior to being coated with the coating agent, the substrate may be subjected to chemical treatment with any of acids, alkalis and various organic solvents, or to physical treatment with plasma, UV rays and the like, or to detergent treatment with various detergents, or to sand-blasting treatment, or to primer treatment with various resins, whereby the adhesiveness of the substrate and the cured film formed thereon is increased.

If desired, an antireflection film of an inorganic oxide deposit may be provided on the cured film formed on the optical element according to the invention in the manner mentioned above. The antireflection film is not specifically defined, and may be any conventional, single-layered or multi-layered antireflection film of an inorganic oxide deposit. Some examples of the antireflection film are described in, for example, Japanese Patent Laid-Open Nos. 262104/1990 and 116003/1981, any of which are employable herein.

The cured film of the coating agent of the invention can be a high-refractive-index film serving as a reflective film. In addition, the cured film may be further processed to make it have additional functions of antifogging properties, photochromic properties, stain-resistant properties and others, and the thus-processed films could be used as a multi-functional films.

The cured film-coated optical element of the invention can be used not only for lenses for eyeglasses but also for lenses for cameras, windshields for cars, optical filters to be mounted on displays for word processors, and any other suitable purpose.

EXAMPLES

The invention is now described in more detail with reference to the following Examples, which, however, are not intended to restrict the scope of the invention.

The physical properties of the cured film-coated optical elements produced in Examples were measured according to the methods mentioned below.

(1) Test for Initial Physical Properties:

The cured film-coated optical elements produced were left at room temperature for 1 day, and evaluated for the following properties (i) to (iv):

(i) Evaluation of Scratch Resistance:

The surface of the cured film was rubbed with steel wool #0000 20 times back and forth, with a load of 2 kg being applied thereto, and macroscopically checked for its scratch resistance. The samples thus tested were judged according to the following criteria:

OO: Samples scratched little.

O: Samples with less than 5 scratches.

Δ: Samples with from 5 to less than 10 scratches.

x: Samples with 10 or more scratches, including those scratched to the same level as non-coated optical substrates.

(ii) Evaluation of Interference Fringes:

The cured film-coated optical elements were macroscopically checked by the light of a fluorescent lamp. Interference fringes were judged according to the following criteria:

OO: No interference fringe seen.

O: Interference fringes hardly seen.

Δ: A few interference fringes seen.

x: Many interference fringes seen.

(iii) Evaluation of Adhesiveness:

The cured film was cut to have 100 cross-cuts of 1.5 mm ×1.5 mm each. An adhesive tape (trade name, Sellotape from Nichiban) was firmly stuck on its cross-cut area, and rapidly peeled off, and the cured film was checked as to whether or not its cross-cuts peeled along with the adhesive tape. The samples were judged according to the following criteria:

OO: Not peeled.

O: 1 to 10 cross-cuts peeled.

Δ: 11 to 50 cross-cuts peeled.

x: 51 to 100 cross-cuts peeled.

(iv) Evaluation of Transparency:

The cured film was macroscopically checked for its transparency by the light of a fluorescent lamp in a dark room. The samples were judged according to the following criteria OO: Not cloudy.

O: Hardly cloudy at all.

Δ: Slightly cloudy.

x: Very cloudy.

(2) Test for Moisture Resistance

The optical elements were left in a thermo-hygrostat tester (from Yamato Engineering) at 40° C. and 90% RH for 1 week, and then subjected to the tests (i) to (iv).

(3) Test for Lightproofness:

The optical elements were exposed to a xenon long-life weather meter (from Suga Test Machine) for 200 hours, and then subjected to the tests (i) to (iv).

Production Example 1

Production of Component (A) Modified stannic oxide-zirconium oxide composite sol Preparation of stannic oxide sol An amount of 1200 g of an aqueous, pale yellow, transparent stannic oxide sol was dispersed in 10800 g of water, to which was added 4.8 g of isopropylamine. The stannic oxide sol was obtained through reaction of metal tin powder, an aqueous solution of hydrochloric acid and an aqueous solution of hydrogen peroxide, and had the following properties: a specific gravity of 1.420; a pH of 0.40; a viscosity just after stirring of 32 mPa.s; an $SnO_2$ content of 33.0% by weight; an HCl content of 2.56% by weight; a spindle-like colloid particle diameter measured with an electronic microscope of at most 10 nm; a specific surface area of the particles as measured according to the BET method of 120 $m^2/g$; a particle diameter as calculated from the specific surface area of 0.2 nm; and a particle diameter as measured according to the kinematic light-scattering method by the use of a US Coulter's $N_4$ device of 107 nm. Next, the resulting liquid was passed through a column filled with an hydroxyl-type anion exchange resin to obtain 13440 g of an aqueous, alkaline stannic oxide sol. The sol was stable and had a colloid-like tint, but its transparency was extremely high. It had a specific gravity of 1.029, a pH of 9.80, a viscosity of 1.4 mPa.s, an $SnO_2$ content of 2.95% by weight, and an isopropylamine content of 3.036% by weight.

Step (a):

An amount of 10791 g (409.5 g in terms of $SnO_2$) of the aqueous, alkaline stannic oxide sol was added to 3043 g (60.87 g in terms of $ZrO_2$) of an aqueous solution of zirconium oxychloride (having a $ZrO_2$ concentration of 2.0% by weight; and prepared by dissolving a chemical reagent zirconium oxychloride ($ZrOCl_2.8H_2O$) in water), with stirring at room temperature, and further stirred for 2 hours. The resulting mixture was a colloidally-tinted, highly-transparent sol having a ratio by weight, $ZrO_2/SnO_2$ of 0.15 a pH of 1.50.

Step (b) (preparation of stannic oxide-zirconium oxide composite)

The mixture prepared in the step (a) was heated at 90° C. for 5 hours with stirring to obtain 13834 g of a stannic oxide-zirconium oxide composite sol. The sol had a colloid-like tint but was highly transparent, having an $SnO_2$ content of 2.96% by weight, a $ZrO_2$ concentration of 0.44% by weight, a total ($SnO_2+ZrO_2$) content of 3.40% by weight, a pH of 1.45, and a particle size of 9.0 nm.

(Step (c) (preparation of tungsten oxide-stannic oxide-silicon dioxide composite sol)

An amount of 113 g of diatom (having an $SiO_2$ content of 29.0% by weight) was dissolved in 2353.7 g of water, and 33.3 g of sodium tungstate $Na_2WO_4.2H_2O$ (having a $WO_3$ content of 71% by weight) and 42.45 g of sodium stannate $NaSnO_2.H_2O$ (having an $SnO_2$ content of 55% by weight) were dissolved therein. Next, the resultant mixture was passed through a column filled with a hydrogen-type cation exchange resin to obtain 3150 g of an acidic tungsten oxide-stannic oxide-silicon dioxide composite sol. The composite sol had the following properties: a pH of 2.1, a $WO_3$ content of 0.75% by weight, an $SnO_2$ content of 0.75% by weight, an $SiO_2$ content of 1.00% by weight, a ratio by weight, $WO_3/SnO_2$ of 1.0, a ratio by weight, $SiO_2/SnO_2$ of 1.33, and a particle size of 2.5 nm.

(Step (d)

To 3150 g (78.83 g in terms of $WO_3+SnO_2+SiO_2$) of the tungsten oxide-stannic oxide-silicon dioxide composite sol prepared in the step (c), was added 11592.6 g (394.1 g in terms of $ZrO_2+SnO_2$) of the stannic oxide-zirconium oxide composite sol prepared in the step (b), with stirring at room temperature over a period of 20 minutes, and further stirring for 30 minutes. The resulting mixture had a ratio by weight of the tungsten oxide-stannic oxide-silicon dioxide composite colloid ($WO_3+SnO_2+SiO_2$) to the stannic oxide-zirconium oxide composite colloid ($ZrO_2+SnO_2$), ($WO_3+SnO_2+SiO_2$)/$ZrO_2+SnO_2$), of 0.20, a pH of 2.26, and a total metal oxide content of 3.2% by weight, and was somewhat cloudy because it contained micro-aggregates of the colloid particles.

Step (e) (Preparation of modified stannic oxide-zirconium oxide composite sol)

An amount of 9.5 g of diisobutylamine was added to 14742.6 g of the mixture prepared in step (d), and the resulting mixture was passed through a column filled with a hydroxyl-type anion exchange resin (Amberlite 410) at room temperature, and thereafter aged under heat at 80° C. for 1 hour to obtain 16288 g of an aqueous, modified stannic oxide-zirconium oxide composite sol (a thin liquid). The sol had a colloid-like tint but was highly transparent, having a total metal oxide content 2.90% by weight, and a pH of 10.43.

Using a filtration device, the aqueous, modified stannic oxide-zirconium oxide composite sol (a thin liquid) prepared in step (e) was concentrated at room temperature through an ultrafiltration membrane (the membrane was suitable for fractionation of fractions having a molecular weight of 50,000) to obtain 2182 g of an aqueous, high-concentration, modified stannic oxide-zirconium oxide composite sol. The sol was stable having a pH of 8.71, and a total metal oxide ($ZrO_2+SnO_2+WO_3+SiO_2$) content of 18.3% by weight.

To 2182 g of the aqueous, high-concentration, modified stannic oxide-zirconium oxide composite sol, were added 4.0 g of tartaric acid, 6.0 g of diisobutylamine and one drop of a defoaming agent (SN Deformer 483 from Sun-Nopco), with stirring at room temperature, and further stirring for 1 hour. From the sol, water was removed through evaporation under normal pressure, in a reaction flask equipped with a stirrer, with 20 liters of methanol being added thereto little by little. In this manner, water in the aqueous sol was substituted with methanol, and 1171 g of a methanol sol of modified stannic oxide-zirconium oxide composite was obtained. The sol had a specific gravity of 1.124, a pH of 7.45 (in the form of a 1/1 sol/water, by weight, mixture), a viscosity of 2.3 mPa.s, a total metal oxide ($ZrO_2+SnO_2+WO_3+SiO_2$) content of 32.7% by weight, a water content of 0.47% by weight, and a particle size as measured through electronic microscopy of from 10 to 15 nm.

The sol had a colloid-like tint and was highly transparent. Even after left at room temperature for 3 months, it was still stable with no change, that is, it did not form any precipitate, it did not become cloudy, and it did not thicken. The dried sol had a refractive index of 1.76.

Example 1
(1) Preparation of Coating Agent 15 parts by weight of γ-glycidoxypropyltrimethoxysilane and 49 parts by weight of the methanol sol of modified stannic oxide-zirconium oxide composite prepared in Production Example 1 were put into a rector equipped with a rotor, and stirred at 4° C. for 3 hours. Thereafter, 3.5 parts by weight of 0.001 N hydrochloric acid was gradually dripped into the reactor, and stirred at 4° C. for 48 hours.

Next, to the above mixture were added 30 parts by weight of propylene glycol monomethyl ether and 0.04 parts by weight of a silicone-type surfactant, and stirred at 4° C. for 3 hours, and then 0.60 parts by weight of acetylacetonato aluminum and 0.05 parts by weight of aluminum perchlorate (from Aldrich) were added thereto and mixed. After stirring at 4° C. for 3 days, the resultant mixture was kept static at 4° C. for 2 days to obtain a coating agent.
(2) Formation and Evaluation of Cured Film A plastic lens substrate (from a plastic eyeglass lens from HOYA, having a refractive index of 1.60) that had been pre-treated in an aqueous solution of 10 wt. % NaOH was immersed in the coating agent prepared in above (1), for 5 seconds. After having been thus immersed, the plastic lens was pulled out at a rate of 20 cm/min, and heated at 120° C. for 1 hour, whereby a cured film was formed thereon. The cured film-coated plastic lens was tested, and the resultant data are given in Table 1.

Example 2

The cured film-coated plastic lens substrate obtained in Example 1 was disposed in a vapor deposition device, and heated therein at 85° C. while the device was degassed to a vacuum of $2\times10^{-5}$ Torr. In that condition, vaporizing materials also disposed in the device to form an antireflection film on the cured film of the lens substrate were vaporized and deposited on the cured film by heating them with electron beams thereby forming an antireflection film on the cured film. The antireflection film was composed of: a subbing layer of $SiO_2$ having a thickness of 0.6 λ; a mixed layer (nd =2.05, nλ=0.075 λ) of $Ta_2O_5$, $ZrO_2$ and $Y_2O_3$ formed on the subbing layer; a first refractive layer (nd=1.46, nλ=0.056 λ) of $SiO_2$; a mixed layer (nd=2.05, nλ=0.075λ of $Ta_2O_5$, $ZrO_2$ and $Y_2O_3$; and a second low-refractive-index layer (nd= 0.46, nλ=0.25 λ) of $SiO_2$, layered in that order. The thus-coated plastic lens was tested, and the resultant data are given in Table 1.

Example 3

A cured film-coated plastic lens was produced in the same manner as in Example 1, except that 15 parts by weight of β-(3,4-epoxycyclohexyl)ethyltrimethoxysilane was used in place of 15 parts by weight of γ-glycidoxypropyltrimethoxysilane in the step of Example 1(1). The resultant data are given in Table 1.

Example 4

The same process as in Example 2 was repeated, except that the cured film-coated plastic lens substrate produced in Example 3 was used in place of that produced in Example 1. The resultant data of the coated lens are given in Table 1.

Example 5

A cured film-coated plastic lens was produced in the same manner as in Example 1, except that 15 parts by weight of tetramethyoxysilane (methyl silicate) was used in place of 15 parts by weight of γ-glycidoxypropyltrimethoxysilane, and, as the curing agent, 0.60 parts by weight of trimellitic anhydride was used in place of 0.60 parts by weight of acetylacetonato aluminum in the step of Example 1(1). The resultant data are given in Table 1.

Example 6

The same process as in Example 2 was repeated, except that the cured film-coated plastic lens substrate produced in Example 5 was used in place of that produced in Example 1. The data of the coated lens are given in Table 1.

Comparative Example 1

A cured film-coated plastic lens was produced in the same manner as in Example 1, except that 49 parts by weight of a modified stannic oxide-tungsten oxide composite sol (described in Japanese Patent Laid-Open No. 27301/1994) was used in place of 49 parts by weight of the methanol sol of modified stannic oxide-zirconium oxide composite (prepared according to Production Example 1) in the step of Example 1(1). The resultant data are given in Table 1.

Comparative Example 2

The same process as in Example 2 was repeated, except that the cured film-coated plastic lens substrate produced in Comparative Example 1 was used in place of that produced in Example 1. The resultant data of the coated lens are given in Table 1.

Comparative Example 3

A cured film-coated plastic lens was produced in the same manner as in Example 1, except that 49 parts by weight of a tungsten oxide-stannic oxide composite sol (this is described in Japanese Patent Laid-Open No. 27301/1994) and 10 parts by weight of a silica sol dispersed in methanol (having a particle size of from 10 to 20 nm and a solid content of 20% by weight) were used in place of 49 parts by weight of the methanol sol of modified stannic oxide-zirconium oxide composite (prepared according to Production Example 1) in the step of Example 1(1). The resultant data are given in Table 1.

Comparative Example 4

The same process as in Example 2 was repeated, except that the cured film-coated plastic lens substrate produced in Comparative Example 3 was used in place of that produced in Example 1. The data of the coated lens are given in Table 1.

Comparative Example 5

A cured film-coated plastic lens was produced in the same manner as in Example 1, except that 49 parts by weight of a silica sol dispersed in methanol (having a particle size of from 10 to 20 nm and a solid content of 20% by weight) was used in place of 49 parts by weight of the methanol sol of modified stannic oxide-zirconium oxide composite (this was prepared in Production Example 1) in the step of Example 1(1). The resultant data are given in Table 1.

Comparative Example 6

The same process as in Example 2 was repeated, except that the cured film-coated plastic lens substrate produced in Comparative Example 5 was used in place of that produced in Example 1. The data of the coated lens are given in Table 1.

The cured film-coated optical element of the invention has good scratch resistance, good moisture resistance and good weather resistance. Even when a film of an inorganic oxide deposit is formed thereon, the properties of the cured film are degraded little. Even when high-refractive-index plastic lenses are coated with the cured film, they do not have interference fringes.

While the present invention has been described with reference to certain preferred embodiments and illustrative examples, one of ordinary skill in the art will recognize that deletions, additions, modifications, substitutions and improvements can be made while remaining within the spirit and scope of the present invention. The scope of the invention is determined solely by the appended claims.

What is claimed is:

1. An optical element comprising an optical substrate and a cured film coating thereon wherein the cured film coating is formed from a coating agent comprising (A) modified stannic oxide-zirconium oxide composite colloid particles prepared by coating at least a part of surfaces of stannic oxide-zirconium oxide composite colloid particles with stannic oxide-tungsten oxide-silicon oxide composite colloid particles, and (B) an organosilicon compound.

2. The optical element having a cured coating film as claimed in claim 1, wherein the optical substrate is a plastic lens having a refractive index of from 1.55 to 1.62.

3. The optical element having a cured film coating as claimed in claim 1, wherein the modified stannic oxide-zirconium oxide composite colloid particles of component (A) in the coating agent have a particle size of from 4.5 to 60 nm, and are prepared by coating at least a part of the surfaces of stannic oxide-zirconium oxide composite colloid particles which have a particle size of from 4 to 50 nm and

TABLE 1

| | Evaluation of Initial Physical Properties | | | | Evaluation of Physical Properties after Moisture Resistance Test | | | | Evaluation of Physical Properties after Weather Resistance Test | | | |
|---|---|---|---|---|---|---|---|---|---|---|---|---|
| | Scratch Resistance | Adhesiveness | Interference Fringes | Transparency | Scratch Resistance | Adhesiveness | Interference Fringes | Transparency | Scratch Resistance | Adhesiveness | Interference Fringes | Transparency |
| Ex. 1 | ⊙ | ⊙ | ○ | ○ | ○ | ⊙ | ○ | ○ | ○ | ⊙ | ○ | ○ |
| Ex. 2 | ⊙ | ⊙ | ○ | ○ | ○ | ⊙ | ○ | ○ | ○ | ⊙ | ○ | ○ |
| Ex. 3 | ⊙ | ⊙ | ○ | ○ | ○ | ⊙ | ○ | ○ | ○ | ⊙ | ○ | ○ |
| Ex. 4 | ⊙ | ⊙ | ○ | ○ | ○ | ⊙ | ○ | ○ | ○ | ⊙ | ○ | ○ |
| Ex. 5 | ⊙ | ⊙ | ○ | ○ | ○ | ⊙ | ○ | ○ | ○ | ⊙ | ○ | ○ |
| Ex. 6 | ⊙ | ⊙ | ○ | ○ | ○ | ⊙ | ○ | ○ | ○ | ⊙ | ○ | ○ |
| Comp. Ex. 1 | ○ | ⊙ | ○ | ○ | Δ | ⊙ | ○ | ○ | Δ | ⊙ | ○ | ○ |
| Comp. Ex. 2 | ○ | ⊙ | ○ | ○ | Δ | ⊙ | ○ | ○ | Δ | ○ | ○ | ○ |
| Comp. Ex. 3 | Δ | ○ | ○ | x | x | Δ | ○ | x | x | Δ | ○ | x |
| Comp. Ex. 4 | Δ | ○ | ○ | x | x | Δ | ○ | x | x | Δ | ○ | x |
| Comp. Ex. 5 | ⊙ | ⊙ | x | ○ | ○ | ○ | x | ○ | ○ | ○ | x | ○ |
| Comp. Ex. 6 | ⊙ | ⊙ | x | ○ | ○ | ○ | x | ○ | ○ | ○ | x | ○ |

As can be understood from the data in Table 1, the cured film-coated optical elements of Examples 1 to 6 all have good scratch resistance, good adhesiveness, high transparency, good moisture resistance and good weather resistance, without having interference fringes. As opposed to the film-coated optical elements according to the invention, the cured film-coated optical elements of Comparative Examples 1 and 2 have poor moisture resistance and poor weather resistance; and those of Comparative Examples 3 and 4 have poor scratch resistance, low transparency, poor moisture resistance and poor weather resistance. The cured film-coated optical elements of Comparative Examples 5 and 6 have interference fringes, and their appearance is problematic from the esthetic viewpoint.

are composed of stannic oxide colloid particles and zirconium oxide colloid particles bonded in a ratio by weight, $ZrO_2/SnO_2$ falling between 0.02 and 1.0, with tungsten oxide-stannic oxide-silicon dioxide composite colloid particles having a particle size of from 2 to 7 nm and having a ratio by weight, $WO_3/SnO_2$, falling between 0.1 and 100, and a ratio by weight, $SiO_2/SnO_2$, falling between 0.1 and 100.

4. The optical element having a cured coating film as claimed in claim 1, wherein the modified stannic oxide-zirconium oxide composite colloid particles of component (A) in the coating agent are prepared by a process comprising the steps of:

(a) mixing an aqueous stannic oxide sol containing stannic oxide colloid particles having a particle size of from 4 to 50 nm and having an SnO$_2$ concentration of from 0.5 to 50% by weight, with an aqueous solution or suspension of an oxyzirconium salt having a ZrO$_2$ concentration of from 0.5 to 50% by weight, and a ratio by weight, ZrO$_2$/SnO$_2$ falling between 0.02 and 1.0;

(b) heating the mixture obtained in step (a) to form an aqueous, stannic oxide-zirconium oxide composite sol having a particle size of from 4 to 50 nm;

(c) preparing an aqueous solution containing a tungstate, a stannate and a silicate in a ratio by weight, WO$_3$/SnO$_2$, falling between 0.1 and 100, and a ratio by weight, SiO$_2$/SnO$_2$, falling between 0.1 and 100, and removing cations from the aqueous solution to form a tungsten oxide-stannic oxide-silicon dioxide composite sol having a particle size of from 2 to 7 nm;

(d) mixing the aqueous, stannic oxide-zirconium oxide composite sol prepared in step (b) with the tungsten oxide-stannic oxide-silicon dioxide composite sol prepared in the step (c), in a ratio so that the total of WO$_3$, SnO$_2$ and SiO$_2$ is from 2 to 100 parts by weight relative to 100 parts by weight of the total of ZrO$_2$ and SnO$_2$, to form an aqueous, modified stannic oxide-zirconium oxide composite sol having a particle size of from 4.5 to 60 nm; and (e) contacting the aqueous, modified stannic oxide-zirconium oxide composite sol prepared in the previous step (d) with an anion exchanger to thereby remove anions from the sol.

5. The optical element having a cured coating film as claimed in claim 1, wherein the organosilicon compound of component (B) in the coating agent is at least one compound selected from compounds of a general formulas (I) and (II) and hydrolysates of (I) and (II);

wherein the compounds of formula (I) are:

$$R_n Si(OR^2)_{4-n} \quad (I)$$

wherein R$^1$ represents a monovalent hydrocarbon group having from 1 to 20 carbon atoms, and having or not having a functional group; R$^2$ represents an alkyl, aryl, aralkyl or acyl group having from 1 to 8 carbon atoms; n represents 0, 1 or 2; and plural R$^1$'s, if any, are the same or different, and plural R$^2$'s are the same or different;

and wherein the compounds of a general formula (II) are:

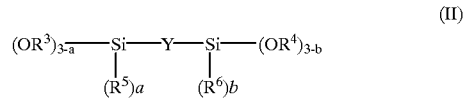

(II)

$$(OR^3)_{3-a}-Si-Y-Si-(OR^4)_{3-b}$$
$$\quad\quad\quad (R^5)_a \quad\quad (R^6)_b$$

wherein R$^3$ and R$^4$ each represent an alkyl or acyl group having from 1 to 4 carbon atoms, and are the same or different; R$^5$ and R$^6$ each represent a monovalent hydrocarbon group having from 1 to 5 carbon atoms, and having or not having a functional group, and are the same or different; Y represents a divalent hydrocarbon group having from 2 to 20 carbon atoms; a and b each represent 0 or 1; and plural OR$^3$'s are the same or different, and plural OR$^4$'s are the same or different.

6. The optical element having a cured coating film as claimed in claim 1, wherein the coating agent comprises the colloid particles of component (A) in a ratio falling between 1 and 500 parts in terms of the solid content relative to 100 parts by weight of the organosilicon compound of component (B).

7. The optical element having a cured coating film as claimed in claim 1, further comprising a medium for the coating agent selected from the group consisting of water, a hydrophilic organic solvent, and mixtures of water and a hydrophilic organic solvent.

8. The optical element having a cured coating film as claimed in claim 1, wherein said component (B) comprises γ-glycidoxypropyltrimethoxysilane.

9. The optical element having a cured coating film as claimed in claim 1, wherein said component (B) comprises β-(3,4-epoxycyclohexyl)ethyltrimethoxysilane.

10. The optical element having a cured coating film as claimed in claim 1, wherein said coating agent further comprises a curing agent.

11. The optical element having a cured coating film as claimed in claim 1, wherein said coating agent further comprises a metal salt of perchloric acid.

12. The optical element having a cured coating film as claimed in claim 11, wherein said metal salt of perchloric acid is aluminum perchlorate.

13. The optical element having a cured coating film as claimed in claim 1, wherein said coating agent further comprises one or more elements selected from the group consisting of water, and a hydrophilic organic solvent.

14. The optical element having a cured coating film as claimed in claim 1, wherein said coating agent comprises component (A) in an amount between about 1 and 500 parts by weight relative to 100 parts by weight of component (B).

15. The optical element having a cured coating film as claimed in claim 1, wherein said optical element is a lens.

16. The optical element having a cured coating film as claimed in claim 1, wherein said optical element is selected from the group consisting of an eyeglass lens and a camera lens.

17. The optical element having a cured coating film as claimed in claim 1, wherein said optical element is a windshield.

18. The optical element having a cured coating film as claimed in claim 1, wherein said optical element is an optical filter.

19. The optical element having a cured film coating as claimed in claim 1, further comprising an antireflection film deposit of an inorganic oxide disposed on the cured coating film.

20. The optical element having a cured coating film as claimed in claim 19, wherein the optical substrate is a plastic lens having a refractive index of from 1.55 to 1.62.

21. The optical element having a cured film coating as claimed in claim 19, wherein the modified stannic oxide-zirconium oxide composite colloid particles of component (A) in the coating agent have a particle size of from 4.5 to 60 nm, and are prepared by coating at least a part of the surfaces of stannic oxide-zirconium oxide composite colloid particles which have a particle size of from 4 to 50 nm and are composed of stannic oxide colloid particles and zirconium oxide colloid particles bonded in a ratio by weight, ZrO$_2$/SnO$_2$ falling between 0.02 and 1.0, with tungsten oxide-stannic oxide-silicon dioxide composite colloid particles having a particle size of from 2 to 7 nm and having a ratio by weight, WO$_3$/SnO$_2$, falling between 0.1 and 100, and a ratio by weight, SiO$_2$/SnO$_2$, falling between 0.1 and 100.

22. The optical element having a cured coating film as claimed in claim 19, wherein the modified stannic oxide-zirconium oxide composite colloid particles of component (A) in the coating agent are prepared by a process comprising the steps of:

(a) mixing an aqueous stannic oxide sol containing stannic oxide colloid particles having a particle size of from 4 to 50 nm and having an SnO$_2$ concentration of from 0.5 to 50% by weight, with an aqueous solution or suspension of an oxyzirconium salt having a ZrO$_2$ concentration of from 0.5 to 50% by weight, and a ratio by weight, ZrO$_2$/SnO$_2$ falling between 0.02 and 1.0;

(b) heating the mixture obtained in step (a) to form an aqueous, stannic oxide-zirconium oxide composite sol having a particle size of from 4 to 50 nm;

(c) preparing an aqueous solution containing a tungstate, a stannate and a silicate in a ratio by weight, WO$_3$/SnO$_2$, falling between 0.1 and 100, and a ratio by weight, SiO$_2$/SnO$_2$, falling between 0.1 and 100, and removing cations from the aqueous solution to form a tungsten oxide-stannic oxide-silicon dioxide composite sol having a particle size of from 2 to 7 nm;

(d) mixing the aqueous, stannic oxide-zirconium oxide composite sol prepared in step (b) with the tungsten oxide-stannic oxide-silicon dioxide composite sol prepared in the step (c), in a ratio so that the total of WO$_3$, SnO$_2$ and SiO$_2$ is from 2 to 100 parts by weight relative to 100 parts by weight of the total of ZrO$_2$ and SnO$_2$, to form an aqueous, modified stannic oxide-zirconium oxide composite sol having a particle size of from 4.5 to 60 nm; and (e) contacting the aqueous, modified stannic oxide-zirconium oxide composite sol prepared in the previous step (d) with an anion exchanger to thereby remove the anions from the sol.

23. The optical element having a cured coating film as claimed in claim 19, wherein the organosilicon compound of component (B) in the coating agent is at least one compound selected from compounds of a general formulas (I) and (II) and hydrolysates of (I) and (II);

wherein the compounds of formula (I) are:

$$R^1Si\,(OR^2)_{4-n} \qquad (I)$$

wherein R$^1$ represents a monovalent hydrocarbon group having from 1 to 20 carbon atoms, and having or not having a functional group; R$^2$ represents an alkyl, aryl, aralkyl or acyl group having from 1 to 8 carbon atoms; n represents 0, 1 or 2; and plural R$^1$'s, if any, are the same or different, and plural R$^2$O's are the same or different;

and wherein the compounds of a general formula (II) are:

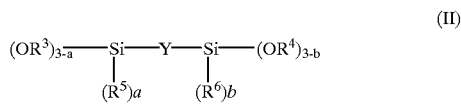

(II)

wherein R$^3$ and R$^4$ each represent an alkyl or acyl group having from 1 to 4 carbon atoms, and are the same or different; R$^5$ and R$^6$ each represent a monovalent hydrocarbon group having from 1 to 5 carbon atoms, and having or not having a functional group, and are the same or different; Y represents a divalent hydrocarbon group having from 2 to 20 carbon atoms; a and b each represent 0 or 1; and plural OR$^3$'s are the same or different, and plural OR$^4$'s are the same or different.

24. The optical element having a cured coating film as claimed in claim 19, wherein the coating agent comprises the colloid particles of component (A) in a ratio falling between 1 and 500 parts in terms of the solid content relative to 100 parts by weight of the organosilicon compound of component (B).

25. The optical element having a cured coating film as claimed in claim 19, further comprising a medium for the coating agent selected from the group consisting of water, a hydrophilic organic solvent, and mixtures of water and an hydrophilic organic solvent.

26. The optical element having a cured coating film as claimed in claim 19, wherein said component (B) comprises γ-glycidoxypropyltrimethoxysilane.

27. The optical element having a cured coating film as claimed in claim 19, wherein said component (B) comprises β-(3,4-epoxycyclohexyl)ethyltrimethoxysilane.

28. The optical element having a cured coating film as claimed in claim 19, wherein said coating agent further comprises a curing agent.

29. The optical element having a cured coating film as claimed in claim 19, wherein said coating agent further comprises a metal salt of perchloric acid.

30. The optical element having a cured coating film as claimed in claim 29, wherein said metal salt of perchloric acid is aluminum perchlorate.

31. The optical element having a cured coating film as claimed in claim 19, wherein said coating agent further comprises one or more elements selected from the group consisting of water, and a hydrophilic organic solvent.

32. The optical element having a cured coating film as claimed in claim 19, wherein said coating agent comprises component (A) in an amount between about 1 and about 500 parts by weight relative to 100 parts by weight of component (B).

* * * * *